April 30, 1963
D. E. AUNSPACH ETAL
3,087,735
PACKING BOX CONSTRUCTIONS
Filed Sept. 13, 1961
2 Sheets-Sheet 1
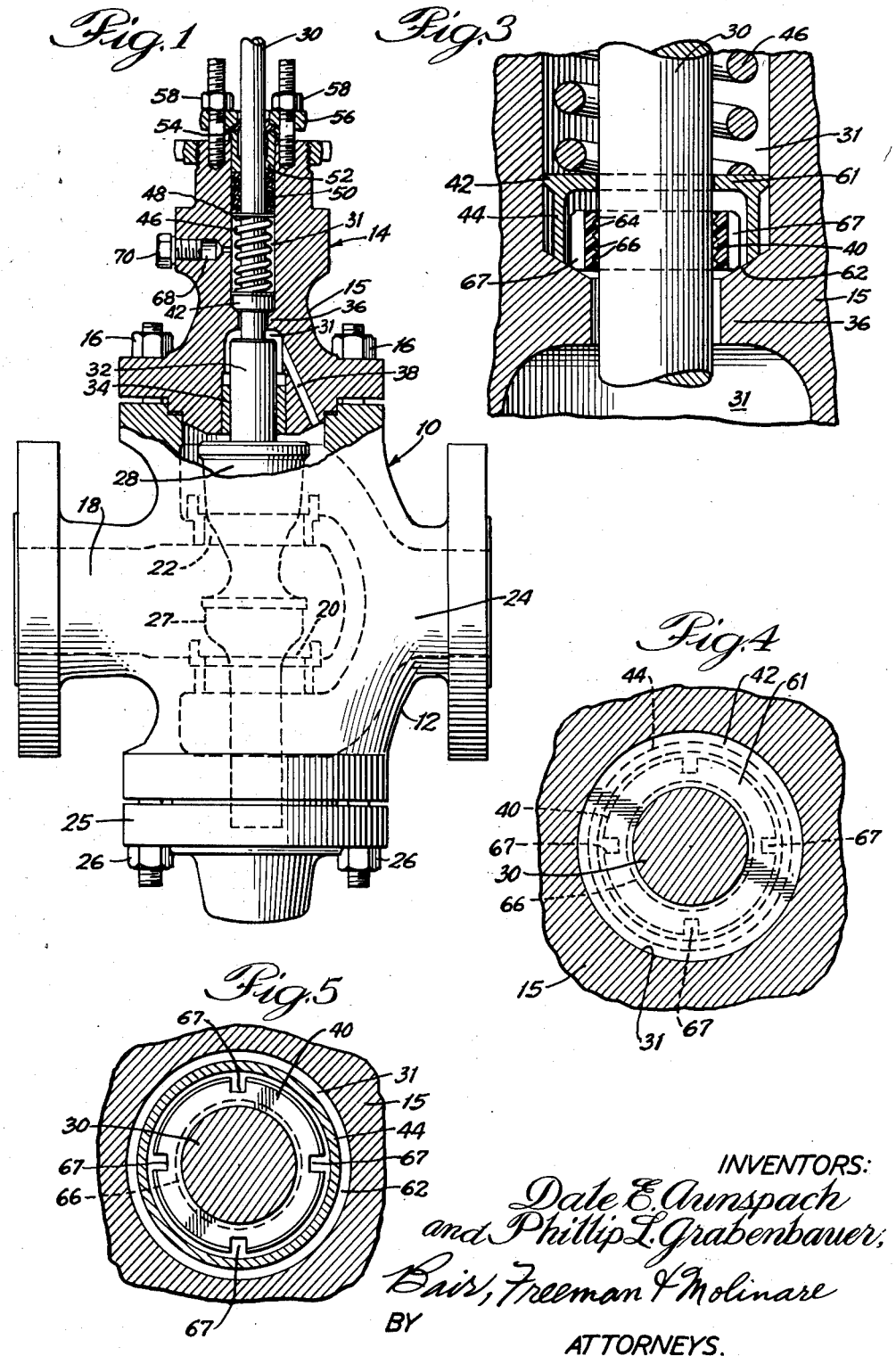
INVENTORS:
Dale E. Aunspach
and Phillip L. Grabenbauer,
BY Bair, Freeman & Molinare
ATTORNEYS.

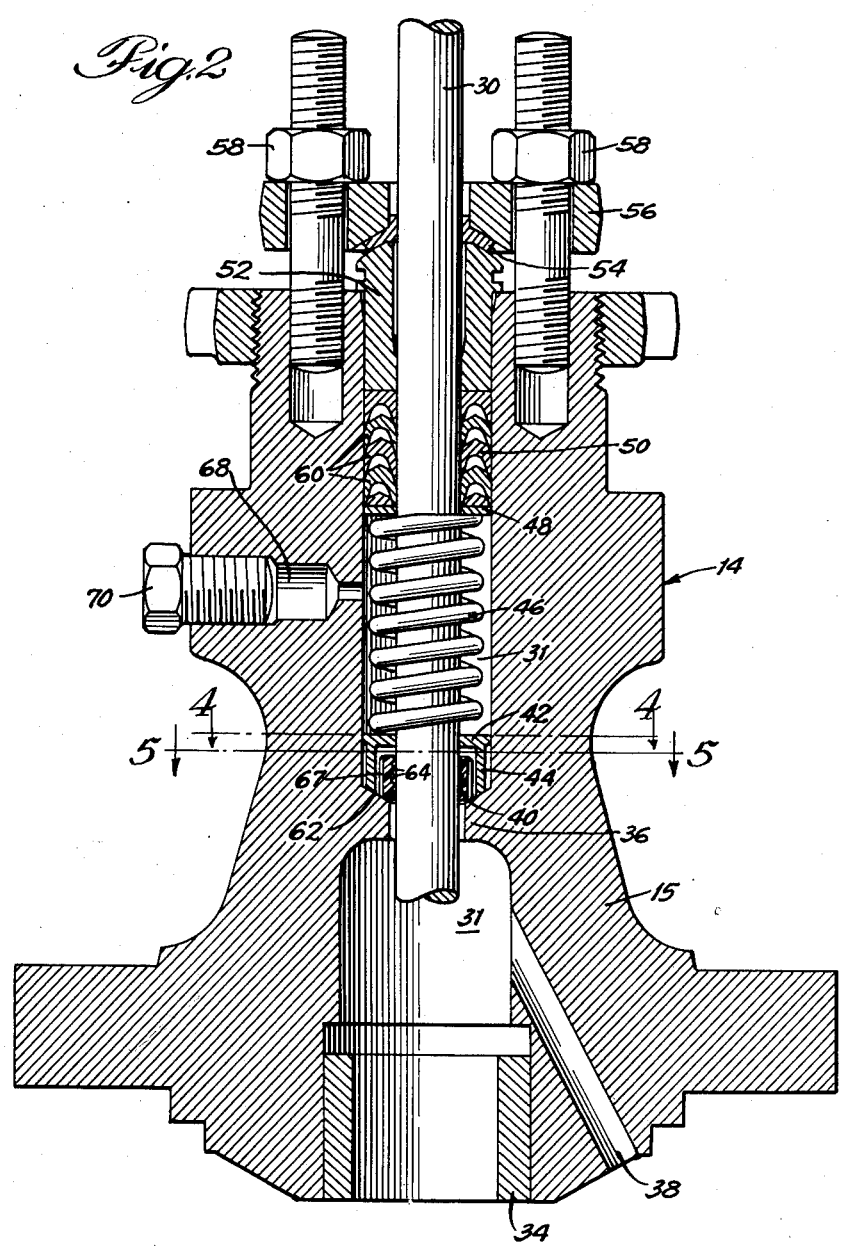

United States Patent Office 3,087,735
Patented Apr. 30, 1963

3,087,735
PACKING BOX CONSTRUCTIONS
Dale E. Aunspach and Phillip L. Grabenbauer, both of Marshalltown, Iowa, assignors to Fisher Governor Company, Marshalltown, Iowa, a corporation of Iowa
Filed Sept. 13, 1961, Ser. No. 137,860
5 Claims. (Cl. 277—59)

This invention relates in general to packing box constructions, and more particularly to an improved arrangement for sealing a valve stem.

The valve stem is usually an elongated rod which carries a valve adapted to control a port through which fluid may flow. It is arranged to be reciprocated for moving the valve into its desired position responsive to a force applied thereagainst and supported in a structure which permits reciprocating movement with the least possible force. At the same time the stem in its support is sealed to prevent the escape of fluid or the introduction of impurities.

Usually the seal for the valve stem is made of an asbestos and/or graphite composition formed in a ring of a height roughly equal to the cross section of the ring. Thus the number of rings in a packing space may be adjusted to a desired depth. The asbestos or graphite composition is suitable for non-corrosive service, but it has the disadvantage that as the service life increases, the composition tends to extrude out of the packing space or box. Therefore, unless the packing is recompressed a leak will occur. It thus become necessary often to tighten or repack the rings.

An improved form of such a sealing arrangement utilizes molded rings of polytetrafluoroethylene otherwise known as virgin Teflon formed in a U-configuration so that the compressive force of one ring upon another tends to flare out the legs of the U. This has the advantage of compensating for an increase in pressure in the body by a self tightening effect while the friction is greatly reduced from that of the described composition type of packing at the required degree of tightness.

Such an improved arrangement, however, requires that the stem have a very fine finish and the finish must remain for the life of the valve, as slight irregularities on the stem will result in cutting a channel through the molded ring as the stem reciprocates therethrough. A leak will therefore eventually result and it cannot be stopped by retightening the bolts. It is of great importance therefore to keep the stem clean and free of dirt and other impurities as such dirt may in time find its way into the packing box parts from either end of the packing box and score the stem and packing.

The purpose of the invention is accomplished by several unique features including two wiping arrangements, one at the top and one at the bottom of the stem. This enables dirt and impurities from either end of the stem to be restrained. However, a solution of this type presents an unusual problem as the pressure of the fluid being moved through the valve port eventually works into the space between the packing and the wiping arrangement adjacent the valve. The result is that even if the pressure in the valve body is relieved, the pressure adjacent the packing may not be, and therefore if the packing is dismantled, the sudden release of pressure may cause explosive separation and serious injury to personnel.

The latter problem is solved in a unique manner by the use of a wiping arrangement comprising a Teflon ring having a series of internal threads that engage against the periphery of the stem adjacent the valve end. This permits the stem to be adequately wiped while any pressure which develops between the ring and the operating or other end of the stem to be relieved back through the valve without the danger of injuring personnel when the valve stem packing is dismantled.

To prevent cold forming and deformation of the Teflon ring due to the spring normally used to bias the packing in one direction, a unique support structure is arranged to shield the ring from the spring force.

In addition, the area of the stem between the Teflon ring and the packing is coated with grease so that the danger of impurities coming into contact with the stem is lessened, or if such impurities result in the wearing of a groove in the stem, the grease can fill such groove to prevent leakage.

The manner of accomplishing the above and other objects of the invention will become apparent upon examination of the following specification and claims, together with the drawings, wherein:

FIGURE 1 is a general elevational view of a valve assembly showing the valve stem and packing box assembly in cross section;

FIGURE 2 is an enlarged cross sectional view of the packing box assembly;

FIGURE 3 is an enlarged view of the ring engaging the valve stem;

FIGURE 4 is a sectional view taken through the line 4—4 in FIGURE 2; and

FIGURE 5 is a sectional view taken through the line 5—5 of FIGURE 2.

In FIGURE 1 a valve assembly is indicated generally by the reference character 10. It comprises a valve body 12 and a packing box and stem assembly 14. The packing box assembly 14 comprises a bonnet or body 15, which is mounted by means of the studs and nuts 16 on the valve body 12.

The valve body 12 contains a passageway 18 communicating through the ports 20 and 22 with a passageway 24 so that fluid may flow between the passageway. The fluid is introduced into the valve body 12 and withdrawn therefrom in any well known manner. A cap or flange 25 mounted on the valve body 12 by means of studs and nuts 26 permits inspection of the valve body. The ports 20 and 22 are adapted to be closed or opened, depending on the desired condition, by the valves 27 and 28.

The valves 27 and 28 are operated by a valve stem or rod 30 which extends through the bore 31 provided in the packing box body 15 and is adapted to be reciprocated therein. The valve stem 30 has enlarged portion 32 adjacent its lower end and seated in a guide bushing 34 carried at the lower end of the bore in the body 15. A narrow neck portion 36 surrounds but does not engage the stem 30 above the stem portion 32. A passageway 38 communicates the space between the neck 36 and guide 34 with the interior of the valve body.

The valve stem 30 extends above the neck 36 and passes through a Teflon wiper 40, a ring 42 having an annular flange 44, a biasing spring 46, a washer 48, a packing assembly 50, a packing follower 52, a felt wiper 54, and a packing flange 56. The operating end of stem 30 protrudes through the flange 56 which is mounted on the body 15 by means of studs and nuts 58.

The nuts 58 are tightened against the packing flange 56 to cause the felt washer 54 to seat against the top of the gland or follower 52 and prevent the entrance of impurities into the space between the follower and stem 30. The packing assembly 50 comprising a series of U-shaped Teflon rings 60 is biased against the follower 52 by the spring 46 which is seated at its lower end on ring 42.

The ring 42, it will be noticed, comprises a disc-like top wall 61 which is engaged with the wall of bore 31. The annular flange 44 on ring 42 rests upon a sloping upper wall 62 of the neck 36 and the Teflon ring 40 is therefore nested within the ring 42 without bearing any of the spring load. The Teflon ring or bushing 40 also rests upon the sloping wall 62 and a plurality of threads 64 are formed in its central aperture. These threads 64 engage against the wall of the stem 30 to wipe the stem while the threads form a passageway 66 along the stem wall. A series of longitudinal slots 67 are formed in the exterior wall of the ring 40 at 90° intervals.

The space in bore 31 between the ring 42 and washer 48 forms a grease chamber. This chamber communicates with a passageway 68 in the body 15. The passageway 68 is for the purpose of introducing grease into the grease chamber between the ring 42 and the washer 48. The passageway 68 is normally closed by a plug 70.

In operation the valve stem 30 is reciprocated by a force applied along its axis in any well known manner to move the valves 27 and 28 into open or closed position for controlling the communication between passageways 18 and 24. The felt wiper 54 prevents the entrance of dirt or impurities from outside the valve, while the packing 50 serves to seal the stem. The ring 40 prevents impurities within the fluid medium from reaching the packing 50. During operation the fluid pressure communicates through passageways 38 and 66 so that pressure is developed in the grease chamber between the ring 42 and washer 48.

When the valve stem assembly 14 and packing assembly 50 are to be disassembled, pressure in the passageway 24 is relieved. The fluid pressure formerly trapped between the ring 42 and washer 48 is now immediately relieved through passageways 66 and 38. The nuts 58 may now be removed without danger of explosive separation of the components and the various elements removed from the bore 31.

Some changes may be made in the construction and arrangements of the parts of our packing box constructions without departing from the real spirit and purpose of our invention, and it is our intention to cover by our claims any modified forms of structure or use of mechanical equivalents which may reasonably be included within their scope.

We claim as our invention:

1. A packing box construction for use in a bore through which an operating rod is adapted to be reciprocated, the improvement comprising a narrow neck portion in said bore, a support ring resting on said portion adjacent the valve operating end of said rod, said support ring comprising an annular portion and a radial wall portion, a spring supported on said radial wall portion of said ring, a packing in said bore remote from said ring and biased by said spring, a wiping bushing ring nested within said support ring and having threads in wiping engagement with said rod to prevent the passage of impurities, said threads defining a passageway between said wiping ring and said rod for venting the space between said support ring and packing.

2. In the construction claimed in claim 1, means for introducing grease into the space between said support ring and packing.

3. A packing box construction for use in a bore through which a valve stem is adapted to be reciprocated for either opening or closing a valve, the improvement comprising a guide bushing at the valve end of said bore, a narrow neck portion in said bore with a sloping wall surface thereon, a ring resting on said sloping wall surface, a spring supported on said ring, another ring nested within said supporting ring and having threads in wiping engagement with said stem whereby impurities are prevented from moving past said other ring while a passageway is formed between said other ring and said stem, a sealing packing biased in one direction by said spring, a retaining gland for said packing, and a felt wiper held in compressed relationship to said retaining gland around the operating end of said stem for preventing the entrance of impurities between said sealing packing and said stem.

4. The construction claimed in claim 3 in which said other ring is provided with a series of longitudinal grooves formed in its periphery.

5. A packing box construction for use in a bore through which a valve stem is adapted to be reciprocated for either opening or closing a valve, the improvement comprising an abutment portion in said bore, a support ring having a transverse wall section encircling said stem, said support ring engaging said abutment portion, a spring supported on said transverse wall section, another ring nested within said support ring on the other side of said wall section, said other ring having threads in wiping engagement with said stem whereby a passageway is formed between said other ring and said stem while impurities are prevented from passing said other ring, a sealing packing biased in one direction by said spring, a retaining gland for said packing, and a felt wiper held in compressed relationship to said retaining ring around the operating end of said stem for preventing the entrance of impurities between said packing and said stem from the operating end.

References Cited in the file of this patent

UNITED STATES PATENTS

| | | |
|---|---|---|
| 1,700,894 | Joyce et al. | Feb. 5, 1929 |
| 2,182,034 | Von Oberstadt | Dec. 5, 1939 |
| 2,396,123 | Phillips | Mar. 5, 1946 |
| 2,443,332 | Summers | June 15, 1948 |
| 2,446,380 | Meyers et al. | Aug. 3, 1948 |
| 2,814,514 | Beatty | Nov. 26, 1957 |
| 2,869,942 | Volpin | Jan. 20, 1959 |
| 2,982,590 | Gunning | May 2, 1961 |

FOREIGN PATENTS

| | | |
|---|---|---|
| 834,998 | Great Britain | May 18, 1960 |